Dec. 3, 1935.    G. R. ANDERSON    2,023,259
ELECTRIC MACHINE
Filed March 17, 1932    3 Sheets-Sheet 1
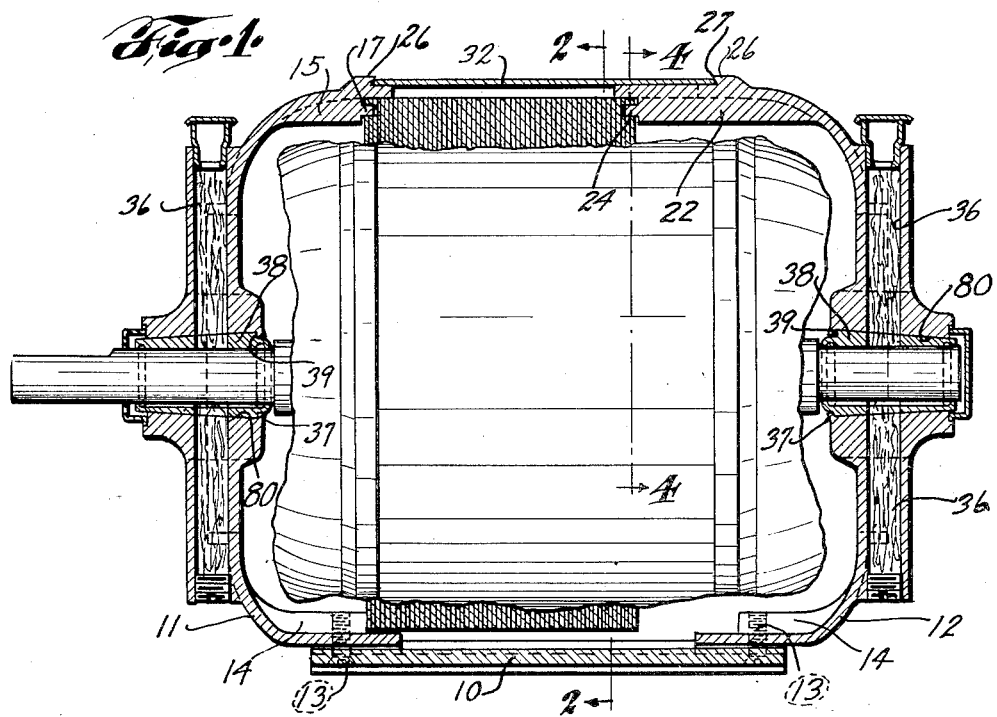
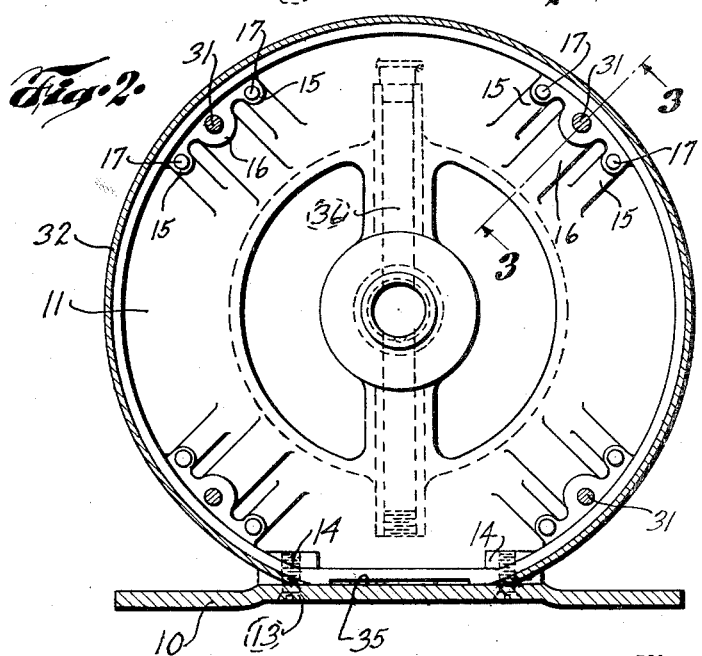
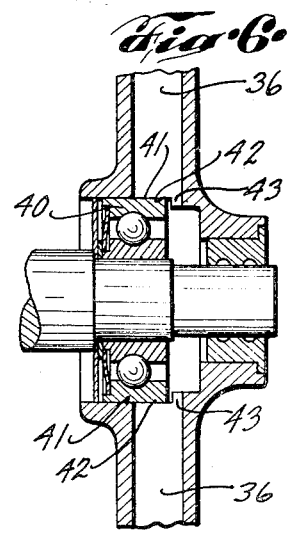
INVENTOR.
GORDON R. ANDERSON
BY
ATTORNEY.

Dec. 3, 1935.   G. R. ANDERSON   2,023,259
ELECTRIC MACHINE
Filed March 17, 1932   3 Sheets-Sheet 2
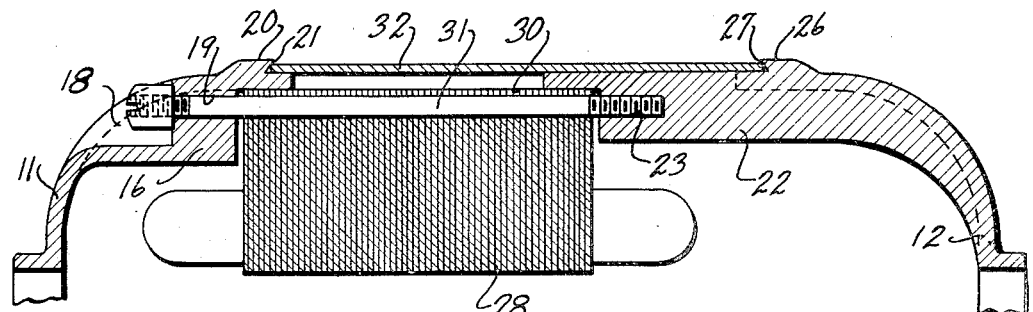
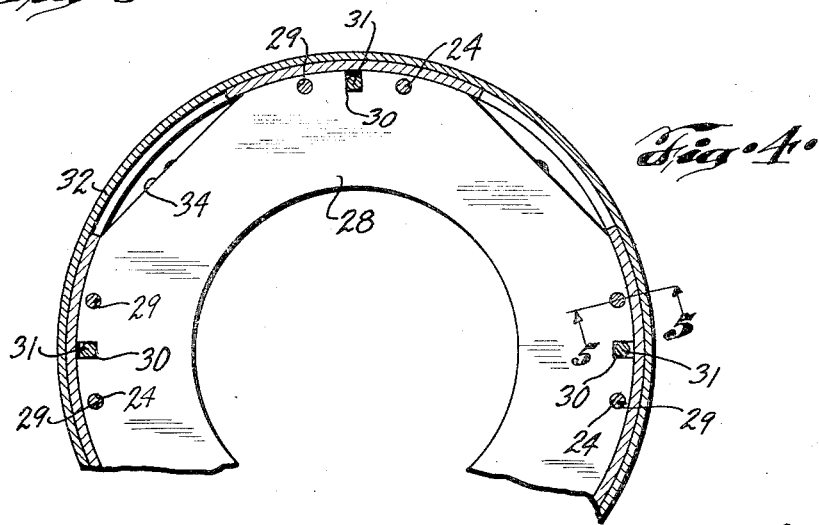
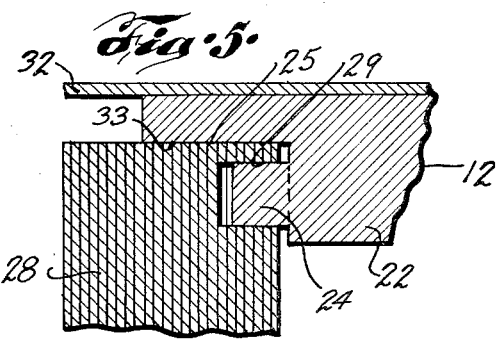
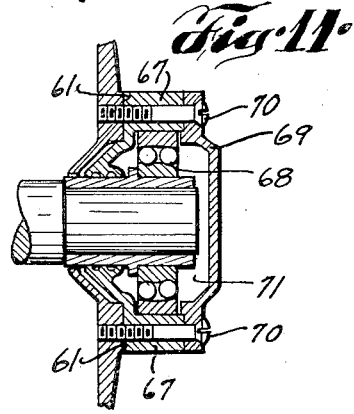
INVENTOR.
GORDON R. ANDERSON
BY
ATTORNEY.

Dec. 3, 1935.   G. R. ANDERSON   2,023,259
ELECTRIC MACHINE
Filed March 17, 1932   3 Sheets-Sheet 3
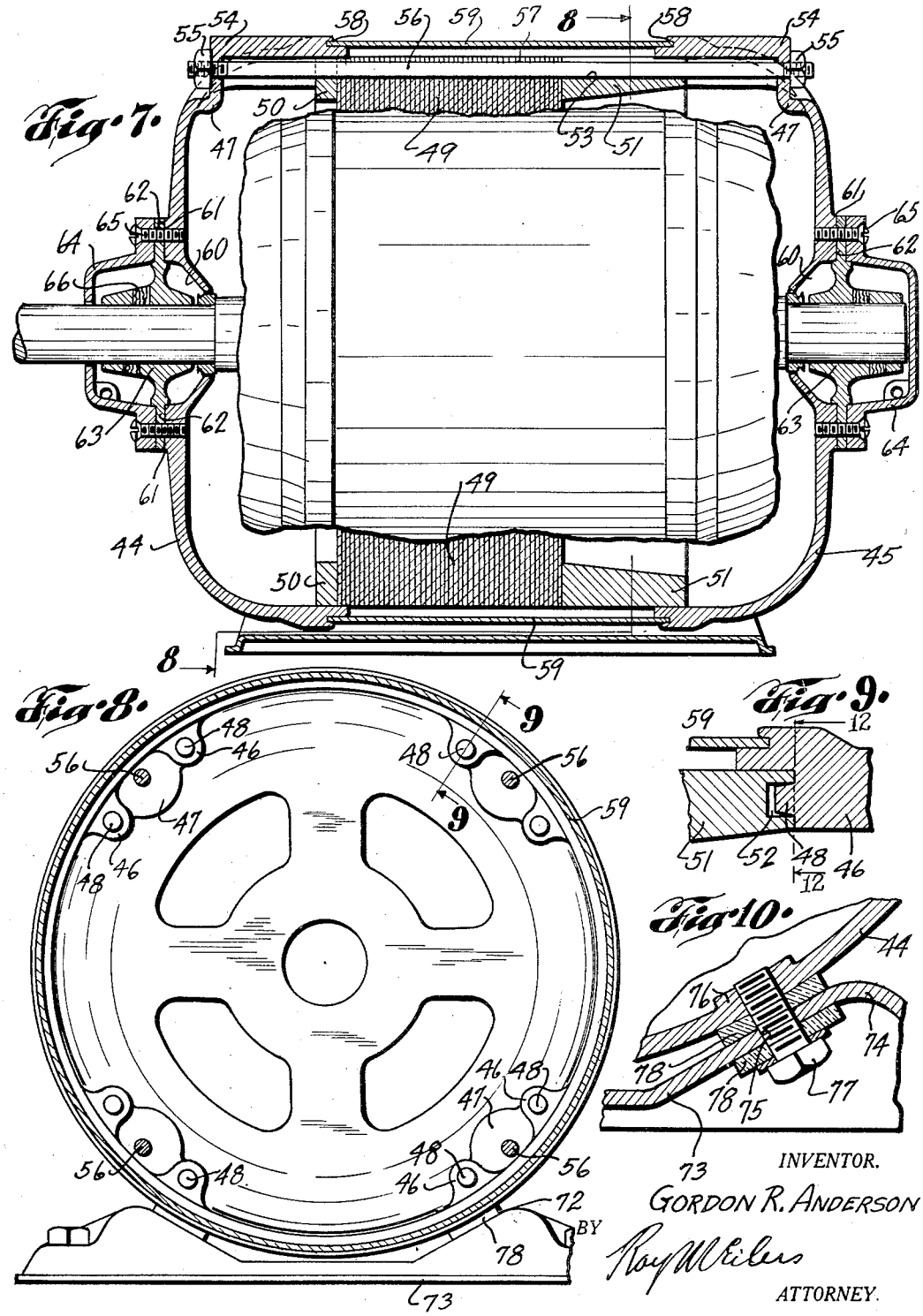
INVENTOR.
GORDON R. ANDERSON
BY Roy W. Eilers
ATTORNEY.

Patented Dec. 3, 1935

2,023,259

UNITED STATES PATENT OFFICE 2,023,259

ELECTRIC MACHINE

Gordon R. Anderson, Beloit, Wis., assignor to Fairbanks, Morse & Co., Chicago, Ill., a corporation of Illinois Application March 17, 1932, Serial No. 599,402

9 Claims. (Cl. 172—36)

This invention relates to improvements in electric machines, and more particularly to such improvements as relate to the construction and assembly of certain parts of electric machines.

An object of this invention is to provide certain improvements in the construction and assembly of electric machines which are designed to lower the cost of production, and manufacture, and to decrease the weight of the machines by a novel and effective substitution of a sheet metal stator core cover for the usual heavy and costly frame structure.

Another object of this invention is to provide an electric machine with a sheet metal stator core cover which will eliminate the old, heavy, and solid stator core frame, and which, in combination with the assembled bearing arms, will be equally as effective as the old frame structure in holding the stator core free from any vibration.

A further object of this invention is to provide an electric machine which may be operated under overloads and at high temperatures, without encountering any of the usual troubles from the expansion of abutting metal parts, of different material and expansion coefficient, by an improved method of joining the various parts of the machine with dowel, or anchor pins.

Yet another object of this invention is to provide an electric machine with die-cast bearing arm members, preferably of aluminum alloy, or other light and inexpensive, non-magnetic material, and having bearing seats provided for in the die-casting process.

A number of additional objects of the invention may be mentioned as attained in an improved bearing arm structure which is selectively adaptable either to plain or sleeve type bearings, and bearings of anti-friction types, the bearing arms including lubricant-containing spaces adaptable to be utilized with either type of bearing; an arrangement of bearings and bearing arms such that it is possible to remove and replace bearings without disturbing the bearing arms; an improved arrangement embodying a base detachably secured to the frame of the machine and insulated therefrom against vibration, as by rubber cushioning elements.

Further objects and advantages will appear from the drawings, and the following detailed description of the invention.

As a matter of convenience in description, the structure shows the invention as applied to a small machine, such as, for example, an induction-repulsion motor.

In the drawings, Fig. 1 is a longitudinal sectional elevation of a machine in which features of this invention appear; Fig. 2 is a sectional end elevation of the machine, as taken along the line 2—2 in Fig. 1, with certain of its parts removed; Fig. 3 is an enlarged, fragmentary, longitudinal elevation of the machine, as taken along the line 3—3 in Fig. 2, showing a preferred means for assembling the bearing arms to the stator core assembly; Fig. 4 is a fragmentary end elevation of the machine, as taken along the line 4—4 in Fig. 1, showing, with certain parts of the machine removed, the arrangement of the anchor joints between the stator core and a bearing arm; Fig. 5 is an enlarged fragmentary detail view of a pin, or anchor joint, as taken along the line 5—5 in Fig. 4; Fig. 6 is an enlarged fragmentary sectional elevation of the bearing portion of a bearing arm, showing the application of ball bearings and races, in place of a sleeve bearing, as illustrated in Fig. 1; Fig. 7 is a longitudinal, sectional elevation of a modified form of machine, incorporating the features of this invention; Fig. 8 is an elevation of a bearing arm of the modified machine, as viewed from the line 8—8 in Fig. 7, showing certain adjacent elements in section, but with the stator core and its end members removed, and particularly showing those portions of the anchor joints carried by the bearing arm; Fig. 9 is an enlarged fragmentary detail view of a pin, or anchor joint, as shown along the line 9—9 in Fig. 8; Fig. 10 is an enlarged sectional, end view detail of a preferred means of securing the motor frame to a base plate; Fig. 11 is an enlarged fragmentary side elevation of the bearing portion of a bearing arm, showing the application of ball bearings and races, in place of a sleeve bearing, as shown in Fig. 7, and Fig. 12 is a fragmentary end elevation of one of the stator spacing members, showing the anchor joint elements which cooperate with those of Fig. 8, Fig. 12 being viewed along line 12—12 of Fig. 9 considering the element 46 as removed.

Proceeding now with a description of the invention, and referring to the parts thereof by numerals of reference, 10 designates a base plate, for mounting the motor in any desired position. Bearing arms 11 and 12, each substantially of a shallow bowl shape, are attached to the base plate by screws 13, secured in lug portions 14, which may be cast integrally with each arm. The bearing arms may be die-cast, preferably of aluminum alloy or other non-magnetic material. Positioned near the outer rim of the bearing arm 11, and on the under side thereof, are lugs 15 and 16, provided for in the casting mold, the lugs 15 being located one on each side of the lug 16. The outermost ends 17 of the lugs 15 are, preferably, in the form of dowel pins, whereas the lug 16 has an external cut-away portion 18, provided for in the molding process, and a bolt aperture 19 in the vertical portion of the lug for a purpose presently to appear. There are preferably four sets of lugs 15 and 16, each set equally spaced, circumferentially, and each having, preferably, a forty-five degree relation with the horizontal lateral axis of the machine. Externally of the bearing rim is a raised ring portion 20, which provides for a circumferential notch 21, for a purpose presently to appear. The bearing arm 12 corresponds in form, size, and the position of its four sets of fastening lugs, to the bearing arm 11, the difference between the two arms being in the length of the lugs. The lugs 22 of arm 12 extend a predetermined length beyond the outermost edge of the bearing arm, the center lug having a drilled and tapped bore 23, to receive the threaded end of a bolt, and the lug on each side of the center lug having a dowel pin end 24, positioned in a recess or notch portion of the lug end, as shown at 25 in Fig. 5. By extending the lugs 22 beyond the rim of the bearing arm 12, sufficient clearance space is provided for a commutator, and brush and brush holder supporting frame. A raised ring portion 26, externally of the bearing arm rim, and integral therewith, is provided to form a notch 27, for a purpose presently to appear.

A laminated field core 28 is provided with dowel pin receiving apertures 29 and open slots 30 so arranged as to correspond, in position, with the sets of lugs on the bearing arms. The field core is held between the bearing arms by a through bolt 31 in each of the four core slots 30. The threaded end of the bolt 31 is passed through the slot 30 in the core, and secured in the threaded bore 23, of the lug 22, in bearing arm 12.

A cylindrical sheet metal core cover 32 is secured between the notches 21 and 27, as shown in Fig. 3, the relatively light cover being designed to replace the usual heavy field ring frame, as heretofore employed with electric machines. The width of the sheet metal cover is so proportioned as to prevent a binding of the field core between the lugs 15, 16 and 22, when the assembly bolts 31 are drawn up, the core being held just firmly enough to prevent any noisy vibration. The field core is radially positioned, and vertically aligned, by abutments between portions of its circumferential surface with the overlying flange surface of the bearing arm 11, and the under surface 33 of the lugs 22 of bearing arm 12, as shown in Fig. 5. The field core is preferably constructed with a flat end portion 34 so that it may clear the flat portion 35 of the base. To facilitate rapid assembly, the field core is provided with four equally spaced flat end portions, so that it may be inserted between the bearing arms with only a small axial rotation to bring the nearest flat portion parallel to the flat part of the base 10.

In casting the bearing arms, provision is made for a tapered sleeve bearing bore 80, positioned centrally of the bearing arm, and lubricating wells 36 which are in alignment on each side and transversely of the shaft receiving bore, the wells being preferably adapted for wick lubrication, when sleeve type bearings are employed, as in Fig. 1. At the same time, a peening edge 37 is formed on the inner end of the metal which forms the conical shaped bore 80. Upon fitting a tapered sleeve bearing 38 in the bore 80, the edge 37 is peened over against a shoulder 39, provided on the inner end of the sleeve bearing, for retaining the sleeve in the bore. Fig. 6 shows a modification in the sleeve bearing bore, adapting it for the insertion of a ball bearing 40. The inner portion of the original bore 80 is reamed out so that the surface of the outer ball bearing race 41 may fit snugly within the aperture. As shown in Fig. 6, the lubricating wells 36 are not closed, as the outer ball bearing race surface does not extend wholly over the well feed openings 42, the portions 43 of the opening remaining clear to permit lubrication of the bearings. When ball bearings are used, the lubricating wells 36 may be packed with a suitable grease, in place of the wick lubrication as used with sleeve type bearings. In assembling the machine, one of the bearing arms is secured to the base plate 10, and the field core placed in assembled relation with the dowel pins. The armature and frame cover may then be placed in their respective positions, and the remaining bearing arm brought into assembled engagement with the frame cover, field core and armature, after which the through bolts, for holding the field core, frame cover and bearing arms in assembly, may be drawn up.

In the modified machine (shown in Fig. 7) both bearing arms 44 and 45 are preferably alike in every detail. A bearing arm lug 46, positioned on each side of a lug 47, is provided with a dowel pin 48 on its end, the pin being positioned in a recess, as shown in Fig. 9. There are four sets of lugs 46 and 47, each set equally spaced on the under side of the bearing arm rim. Die cast about the circumferential end surface of a laminated field core 49, on each end thereof, are spaced elements 50 and 51, the element 51 being of greater length than the element 50 to provide sufficient space for a commutator and brush frame. There are four securing areas on the element 51, spaced to correspond to the general location of the lugs 46 and 47 on the bearing arm 45. In each securing area, the outermost portions are provided with recesses 52 (Fig. 9) for receiving the pin portions 48 of lugs 46, and the center of the area provided with an assembly bolt passage 53 (Fig. 12). The element 50 is provided with securing areas and recesses similarly related to lugs 46 and 47 on bearing arm 44. The lugs 47 have external face portions 54 which act as abutment surfaces for securing nuts 55, on the threaded ends of assembly bolts 56. As in the first described machine, notches 58 are provided, preferably externally of the bearing arm rims, to receive and retain the side edges of a sheet metal cylindrical cover 59. As before, the circumferential width of the cylindrical cover is designed to prevent a binding contact between the bearing arms and the field core, the contact, however, being sufficient to prevent any noisy vibration, or chatter of the parts.

A bearing bore 60 is provided centrally of each of the bearing arms 44 and 45, as shown in Fig. 7. An annular raised, machined surface 61 is provided about the bore 60, for receiving thereon an annular ring portion 62 of a sleeve bearing 63. A bearing cover 64 may be fitted to the outer surface of the sleeve bearing ring 62, and the cover and bearing fastened to the bearing arm 44 (and similarly with arm 45) by suitable screws 65 secured in the annular ring 61. Wick apertures 66 are provided in the sleeve bearing for lubricating purposes.

In assembling the modified machine, the parts may be put together in the same sequence as followed in the assembly of the first machine. After the lugs and recesses have been aligned and fitted together, and assembly bolts 56 passed through the passages provided therefor, and through slots 57 in the core, nuts 55 may then be applied to the threaded end portions of the bolts 56, and drawn up snugly.

Fig. 11 shows the application of a ball bearing to the bearing arms in place of the above described sleeve bearings. A ball bearing retaining member 67, ball bearing 68, and cover 69 are substituted for the sleeve bearing 63 and cover 64, and the bearing assembly held to the bearing arm by suitable screws 70, secured in the annular ring 61. The construction and assembly of the member 67 and cover 69 permits a lubricant to be retained in the space 71 about the ball bearing. It may be observed from Figs. 7 and 11, that the sleeve type bearing and ball bearing units may be interchanged without changing the shaft or the bearing arms. This ready adaptation of the two types of bearings to the same shaft and bearing arms results in a manufacturing advantage in the cost and assembly of the machines, in that it enables a uniform casting to be employed, interchangeably, for bearings of sleeve type and anti-friction type. Stocks of parts and patterns are thus kept at a minimum.

Figs. 8 and 10 show a preferred method of securing the machine, generally designated as 72, to a base plate 73. The base, which may be of a hollow pressed or stamped construction, is provided with an inclined raised surface or arched portion 74 on each of its four corners, the surface of each corner facing the outer cylindrical surface of the machine bearing arms. In addition to their utility as points of securement of the base to the machine, the arched portions of each corner add strength to the base. A threaded bolt aperture 75, in the inclined base portion 74, and apertured and tapped bosses 76 in the machine bearing arm 44 (and similarly in arm 45) are provided for bolts 77, which are preferably applied from the under side of the base plate. A vibration-absorbing pad 78, preferably of rubber, or some similar resilient material, is applied between the bearing arm and the base, concentrically of the bolt, and one also between the under surface of the base and a metal washer under the bolt head.

It is to be understood that the foregoing description of preferred embodiments of my invention in no way limit the invention, and that further alterations and modifications may be made without departing from the full intended scope of the invention as defined in the appended claims.

I claim:

1. In a frame structure for electrical machines, a field core member, a bearing arm member formed of die-cast metal, and having an inner face portion adjacent said core member, spaced projections on one of said members, the other of said members having apertures to receive said projections; and means including a threaded securing element extending through the core member into engagement with the bearing arm for securing the arm and core member in assembled relation.

2. A frame structure for electrical machines, including a field-core structure having spaced recesses in its sides, die cast bearing arms, one at each side of the core structure, and having spaced projections cast thereon and extending into the recesses in the core structure, and means for holding the core structure and bearing arms in assembled relation.

3. In a frame structure for electrical machines, a field-core structure having dowel openings in its opposite sides, die-cast bearing arms formed with inwardly projecting dowels engaging the dowel openings, a flange on each of the bearing arms extended inwardly therefrom and overlying edge portions of the core structure, and assembly bolts for securing the bearing arms and core structure in assembled relation.

4. In a frame structure for electrical machines, a core structure substantially in the central portion of the frame, cast bearing arms disposed at each side of the core structure, each of the bearing arms being provided with inwardly projecting anchor pins, and the core structure being recessed to receive said pins; each of the bearing arms being internally rabbeted to result in a flange portion marginally overlying the core structure, a curved sheet metal cover peripherally engaging the inner ends of the bearing arms and overlying the core structure, undercut seats for said cover formed near the periphery of the bearing arms, and assembly bolts engaging the bearing arms and core structure and adapted to hold said arms, core and cover, in assembled relation.

5. A frame structure for electrical machines, including spaced bearing arms formed with inwardly projecting dowels, a field-core structure supported by and between said arms, and having dowel-receiving openings therein, a cover overlying the core structure in spaced relation, cover-receiving and retaining grooves, formed in the bearing arms, and assembly bolts for securing the bearing arms, cover and core structure in assembled relation.

6. A frame structure for electrical machines including spaced bearing arms provided with inwardly projecting pins, a core structure disposed between the arms and being recessed to receive said pins, a cover overlying the core structure and holding means for the cover, formed by the bearing arms, and adapted grippingly to engage opposite margins of the cover for maintaining a predetermined spacing of the bearing arms, when the bearing arms and core are secured in assembled relation.

7. In an electric machine, a frame structure including an intermediate core of laminated construction, end members for the frame formed of a non-magnetic, die-cast alloy, and means including dowels for securing the core and end members in assembled relation.

8. In an electric machine, a frame, including a central laminated core structure, a body of metal about peripheral portions of the bore structure and extended laterally of opposite side faces thereof to form spacer members, the outer faces of the spacer members having spaced recesses, bearing arms of cast metal, and dowels formed on the inside faces of the bearing arms, and extending interlockingly into said recesses.

9. In an electric machine, a frame including a laminated stator structure, a body of die cast metal about the stator structure adjacent the periphery thereof, and extended laterally of one side face of the stator structure to form a spacer member; a bearing arm member of cast metal, the members having mating surfaces, one thereof provided with spaced recesses and the other with dowels adapted, in assembly, interlockingly to be received by the recesses.

GORDON R. ANDERSON.